United States Patent
Honsinger et al.

Patent Number: 5,835,639
Date of Patent: Nov. 10, 1998

[54] METHOD FOR DETECTING ROTATION AND MAGNIFICATION IN IMAGES

[75] Inventors: Chris W. Honsinger, Webster, N.Y.; Scott J. Daly, Vancouver, Wash.

[73] Assignee: Eastman Kodak Company, Rochester, N.Y.

[21] Appl. No.: 768,679

[22] Filed: Dec. 18, 1996

[51] Int. Cl.⁶ .................................................... G06K 9/64
[52] U.S. Cl. ........................ 382/278; 382/279; 382/284; 382/296; 382/298
[58] Field of Search .................................. 382/279, 284, 382/278, 287, 294, 296, 298, 205, 216, 190, 191, 283, 295, 297, 228; 348/94, 95, 580, 581, 583, 561, 437, 439; 358/451; 345/126, 127, 129, 130

[56] References Cited

U.S. PATENT DOCUMENTS

| | | | |
|---|---|---|---|
| 4,435,835 | 3/1984 | Sakow et al. | 382/8 |
| 4,602,286 | 7/1986 | Kellar et al. | 358/183 |
| 4,759,076 | 7/1988 | Tanaka et al. | 382/46 |
| 5,185,815 | 2/1993 | Brandstetter | 382/31 |
| 5,225,915 | 7/1993 | Ciccone et al. | 358/454 |
| 5,392,361 | 2/1995 | Imaizumi et al. | 382/8 |
| 5,517,319 | 5/1996 | Arai | 358/300 |
| 5,535,007 | 7/1996 | Kim | 358/296 |
| 5,604,819 | 2/1997 | Barnard | 382/151 |

*Primary Examiner*—Jose L. Couso
*Assistant Examiner*—Kanji Patel
*Attorney, Agent, or Firm*—Thomas H. Close

[57] ABSTRACT

A method for detecting an amount of rotation or magnification in a modified image, includes the steps of: embedding a marker image having a pair of identical features separated by a distance d and oriented at an angle α in an original image to produce a marked image, the marked image having been rotated and/or magnified to produce the modified image; performing an autocorrelation on the modified image to produce a pair of autocorrelation peaks corresponding to the location of the features of the marker image in the modified image; and comparing the separation d' and orientation α' of the autocorrelation peaks with the separation d and orientation α of the features in the marker image to determine the amount of rotation and magnification in the modified image.

7 Claims, 3 Drawing Sheets

METHOD FOR DETECTING ROTATION AND MAGNIFICATION IN IMAGES

CROSS-REFERENCE TO RELATED APPLICATIONS

The present application is related to U.S. application Ser. No. 08/565,804, filed Nov. 30, 1995, by Scott J. Daly et al., and entitled, "Method For Embedding Digital Information In An Image", and U.S. application Ser. No. 08/596,818, filed Feb. 5, 1996, by Scott J. Daly, and entitled, "Method and Apparatus for Hiding One Image or Pattern Within Another".

APPENDIX

The disclosure in the appendix of this patent document contains material to which a claim of copyright protection is made. The copyright owner has no objection to the facsimile reproduction of any one of the patent documents or the patent disclosure as it appears in the U.S. Patent and Trademark Office patent file or records, but reserves all other rights whatsoever.

FIELD OF THE INVENTION

The invention relates generally to the field of image processing, and in particular to methods for detecting when an image has been rotated or resized.

BACKGROUND OF THE INVENTION

It is known that photographs or images can have information contained within the image area (for example: bar codes, date and time). It is also known that digital information (computer readable) can be applied to the image area. There are have been several endeavors to embed digital data in images, for example for copyright protection. The techniques that address embedding data in images are limited to special subsets of images including uniform fields of color, graphically generated images with large areas of uniform color (such as the pie-charts of business graphics), or text. Known prior art methods of embedding digital information in images have several drawbacks for application to images having photographic pictorial content. With these technologies, the image may be partially or completely distorted, the embedded data can be digitally removed, or the method may require a significant modification to hardware in order to implement the technology. Some of these technologies use areas outside of the image area (glyphs or bar codes) because the techniques are largely destructive of the image itself and require a uniform background to read the information. Some methods create visible distortions within the image that can be unsightly and/or undesirable. Other techniques such as applying logos, labels, or stickers to an image can be easily hidden (covered) and can also be unsightly. Magnetic strips applied to the image require the scanning devices to be specially modified with a magnetic detector to allow the strip to be sensed. Most of these methods provide a binary solution (that is, they allow only a yes/no or go/no-go solution).

U.S. Pat. No. 4,939,515, issued July 1990, to Adelson shows a technique for embedding digital information in television signals. The technique first decomposes the image into a resolution pyramid, the layer of the pyramid having the highest spatial frequencies is omitted and a Hadamard-based bit stream is substituted. This approach relies on the fact that the optical spot of a CRT contributes far more strongly to the high frequency attenuation of the CRT MTF than any of the transmission components. Therefore, the signal can be encoded, transmitted, and decoded by the electronics, while the optics of the CRT attenuates the high frequencies such that the embedded digital stream is not visibly objectionable. It also relies on the property of human visual psychophysics where the high spatial frequency sensitivity of the visual system is limited to low temporal frequencies, and thus by having the high frequency digital stream change from TV field to TV field, the human eye is not very sensitive to it. This method can achieve data embedding that is entirely invisible under some circumstances (i.e., on TV monitors with poor MTF characteristics, far viewing distances, or certain image sequences).

U.S. Pat. No. 4,972,471, issued November 1990, to Gross uses notch filters and temporal modulation of their output in order to embed digital information inaudibly in recordings. One of the stated applications is toward the monitoring of broadcast recordings for copyrights. The recorded signal is embedded in a two pass algorithm. First the recording is scanned and decomposed into several notch frequencies (frequencies corresponding to the musical diatonic scale are suggested) to look for the best placement of a start code. This is decided by use of the properties of audio masking known from the science of acoustic psychophysics, and the method looks for the presence of two neighboring frequencies, one having a sufficiently higher amplitude than the other. Audio masking dictates that the lower amplitude frequency can be removed without the human observer being able to hear the difference. Once this temporal location is decided in the first pass, the second pass of the algorithm determines the temporal starting point of the code and the notch frequencies used and calibrates this against the existing parallel SMPTE code. This data is stored by those wishing to test identity of the signal (i.e., the owners), and is not made available to those wishing to corrupt the embedded data (i.e., the copyright infringer). The second pass actually embeds the start code pattern and the identifying information in a specified temporal gap after the appearance of the start code. The bits of the identifying information are encoded as temporal modulation of the notch filter content.

U.S. Pat. Nos.: 5,091,966, issued February 1992 to Bloomberg; 5,128,525, issued July 1992 to Stearns, et al.; 5,168,147, issued December 1992 to Bloomberg; 5,221,833, issued June 1993 to Hecht; and 5,245,165, issued September 1993 to Zhang, comprise a family of patents that address embedding digital information invisibly within in hard-copy images. However, they are limited to images containing significant uniform areas of color, such as found in computer-generated graphics for business and science data presentation, or images containing text. The approach they have taken is to use small localized and non-overlapping gray-scale shapes to carry the bit information. The shapes are referred to as glyphs, and are small enough and closely packed so that they visually merge into a uniform field when printed on a sufficiently high resolution device (300 dpi). This technique works in electrophotographic copying machines because such machines have the ability to capture very high resolution edges (the amplitude dimension is often captured with low resolution, however) in order to keep the edges of the text sharp in appearance. The various patents address different shapes, different methods of dealing with scale changes, and different methods of dealing with image skew, such as rotation. The technique is basically a matched filter method used to directly search the embedded image for the glyphs.

Several articles also describe various methods of embedding data for copyright protection. Schyndell, "A digital Watermark" IEEE ICIP-94 (1994) presents a method based on modulation of the least significant bit (LSB) of a digital image. This method requires digital encoding and the message would be lost if that bit is truncated, or if the noise levels in an image are increased, which is likely in the scanning of the digital image out to hard copy form, as well as scanning the image in from hard copy. Sapwater et al., "Electronic Copyright Protection", Photo Electronics Imaging, Vol 7, No. 6, pages 16–21 (1994) explores the issues in copyright protection of digital images, but does not present a satisfactory solution. The proposed solution is to digitally place a copyright symbol in the Yellow layer of a Cyan, Magenta, Yellow, and Black (CMYK) version of a color image. When the image is shown in color, the symbol is hard to see because of the weak blue-yellow sensitivity of the human eye. However, when the color image is broken down into C, M, Y, K layers, and the Y layer is displayed as a black and white image, it is possible for the human observer to see the copyright symbol. Bender et al, "Techniques for Data Hiding", SPIE Proceedings 2420 (1995) present two techniques for embedding small amounts of digital data in images. One of these is termed Texture Block Coding and involves digitally copying a specifically shaped region of texture from one portion of the image to another. The bit pattern is encoded in the shape. Two disadvantages of this technique are that the encoding must be done digitally, and further it requires a skilled image operator to select similarly textured regions to perform the swap. Further, the Bender paper does not explicitly state how to code digital information in the shapes, and has not performed such studies. Another method proposed by Bender is called Patchwork and involves slight offsets of pixels (which may also be low-pass filtered blob-like regions consisting of large numbers of actual pixels) in positive and negative directions so that as a specific path is taken through the image, the expected value of the differences deviates strongly from the mean of the image. This approach is intended to code only one bit of information, but it may be extended to a small number of bits (<8) by methods not explicitly defined in the paper. No way of implementing the technique optically or with hard copy was disclosed. A problem with applying the Patchwork technique to hardcopy is that of finding the proper pathway through an image after it has been converted to a digital image by scanning due to size and rotation issues. Walton, "Image Authentication for a Slippery New Age", Dr. Dobbs Journal, April, page 18–26 (1995) presents a technique for data embedding for image authentication using a checksum method.

Copending U.S. application Ser. No. 08/565,804, filed Nov. 30, 1995, by Scott J. Daly et al., and entitled, "Method For Embedding Digital Information In An Image", describes a method of embedding digital data in an image that includes the steps of: generating a multi-level data image representing the digital data; convolving the multi-level data image with an encoding carrier image to produce a frequency dispersed data image; and adding the frequency dispersed data image to the source image to produce a source image containing embedded data. The data is recovered from the image by: cross correlating the source image containing embedded data with a decoding carrier image to recover the data image; and extracting the digital data from the recovered data image.

One of the problems encountered in applying the Daley et al. method is the sensitivity of the method to rotation and magnification of the image having the embedded data. When the image is rotated or the size is changed, there is a mismatch between the carrier image used at the decoder and the carrier image used to embed the data. As a result of this mismatch, the energy contained in the cross correlation product is reduced, thereby frustrating the recovery of the embedded data.

Currently, the only known methods for correcting for rotation and magnification of an image is to embed visible fiducial marks in the image (or on the periphery of the image) and to manually use the fiducial marks to realign and resize the image. This method is commonly used to align color separations in graphic arts applications.

There is a need therefore for a method for determining if and by how much an image has been rotated or magnified so that the rotation and magnification can be undone.

SUMMARY OF THE INVENTION

The present invention is directed to overcoming one or more of the problems set forth above. Briefly summarized, according to one aspect of the present invention, a method for detecting an amount of rotation or magnification in a modified image, includes the steps of: embedding a marker image having a pair of identical features separated by a distance d and oriented at an angle $\alpha$ in an original image to produce a marked image, the marked image having been rotated and/or magnified to produce the modified image; performing an autocorrelation on the modified image to produce a pair of autocorrelation peaks corresponding to the location of the features of the marker image in the modified image; and comparing the separation d' and orientation $\alpha$' of the autocorrelation peaks with the separation d and orientation $\alpha$ of the features in the marker image to determine the amount of rotation and magnification in the modified image.

The present invention is also useful for automatically aligning and/or resizing any form of digital imagery or video imagery that had been scanned or stored in a data base and in some point have been rotated or resized due to digital manipulation or the operation of a scanner.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage that a preferred image orientation and scale may be stored and recovered automatically from a modified image. The method has the further advantage that the stored information is not visible to the human eye in the modified image. The process works well over a large variety of images, including highly textured or low frequency repetitive digital photographs. The technique allows the use of higher performance carrier images in the data embedding process described in Copending U.S. application Ser. No. 08/565,804, since it eliminates the need for rotationally symmetric carrier signal designs. The present invention may be implemented using an all optical system, thereby providing real time implementation. The technique is also very robust to additive random noise.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
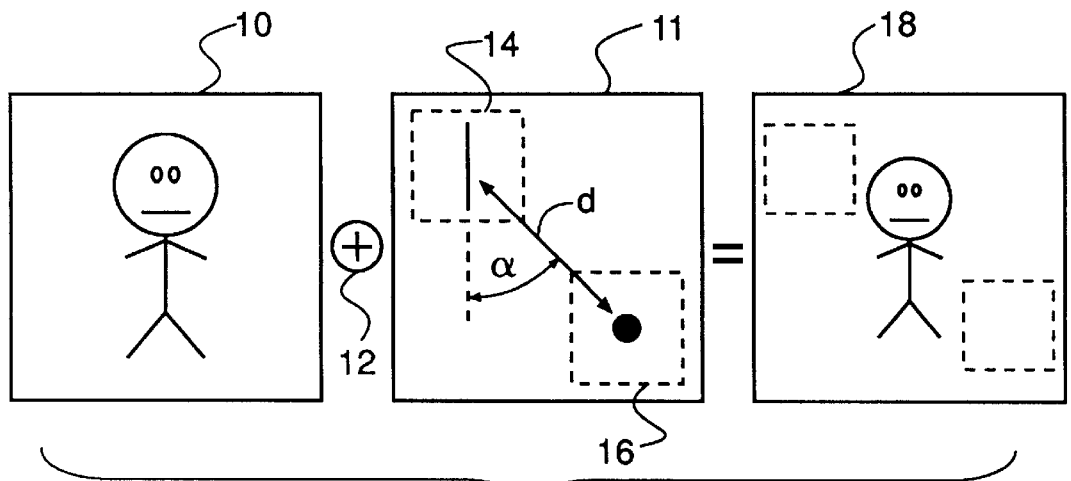
FIG. 1 is a schematic diagram showing the addition of a marker image to an original image according to the present invention.
Figure 2:
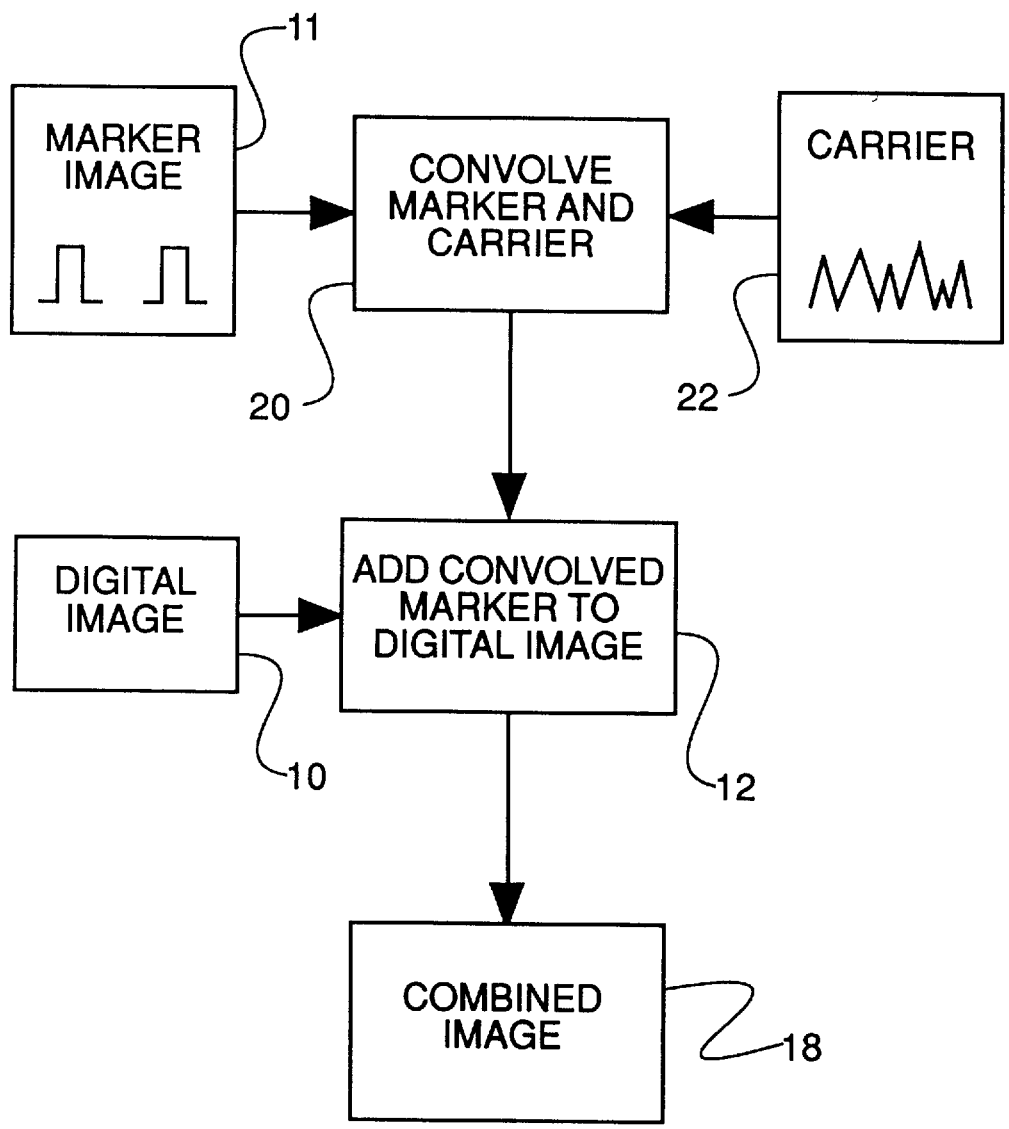
FIG. 2 is a flow chart illustrating one method of generating a marker image employed in the present invention.

Referring to FIGS. 1 and 2, a digital image 10 is prepared by adding 12 a marker image 11 having a pair of identical features 14 and 16 to produce a combined image 18. The identical features 14 and 16 in the marker image 11 are oriented a distance "d" from each other and at an angle "α" with respect to the vertical in image 10. Referring to FIG. 2, prior to adding the marker image 11 to the image 10, the features 14 and 16 in the marker image 11 are convolved 20 with a carrier image 22 and scaled such that their amplitude is low relative to the amplitude of the original image so that the marker image is not visible in the combined image 18. In a preferred embodiment, the marker image features 14 and 16 are delta functions (one pixel at maximum amplitude) convolved with a random carrier signal 22 having a uniform frequency amplitude and random phase.

Figure 6:
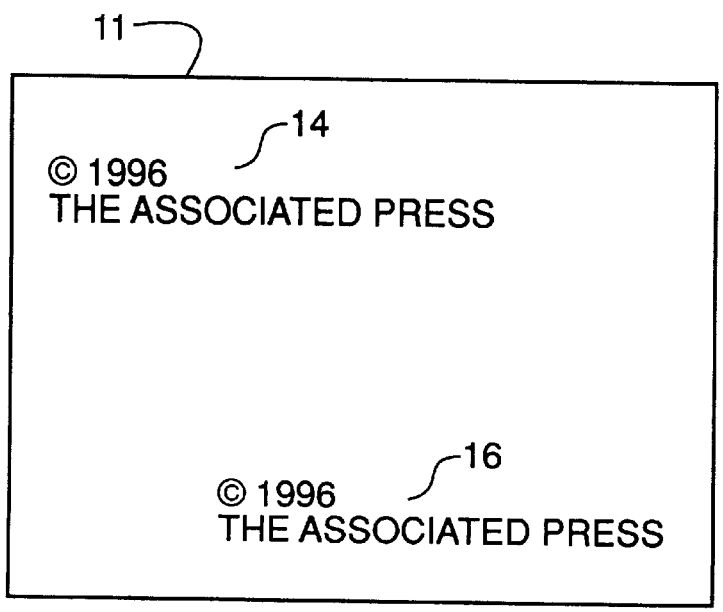
FIG. 6 is a diagram illustrating the use of text in a marker image.

In an alternative embodiment of the invention, the marker image may contain information such as digital code (such as 03 s and 1's ordered in such a way as to effect a message) or text image, see for example FIG. 6, where the pair of text images include a copyright notice. The identical digital code or text images are convolved with the carrier signal 22 as described above and then added to the image 10.

Figure 3:
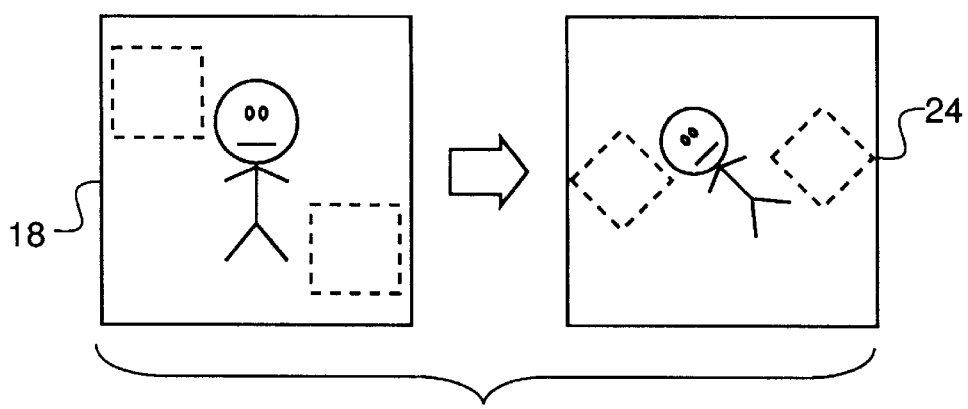
FIG. 3 is a schematic diagram showing rotation and magnification of the marked image to produce a modified image.

Referring to FIG. 3, the angular orientation and/or scale of the combined image 18 is changed, for example in an optical or digital printing or copy process to produce a modified combined image 24.

Figure 4:
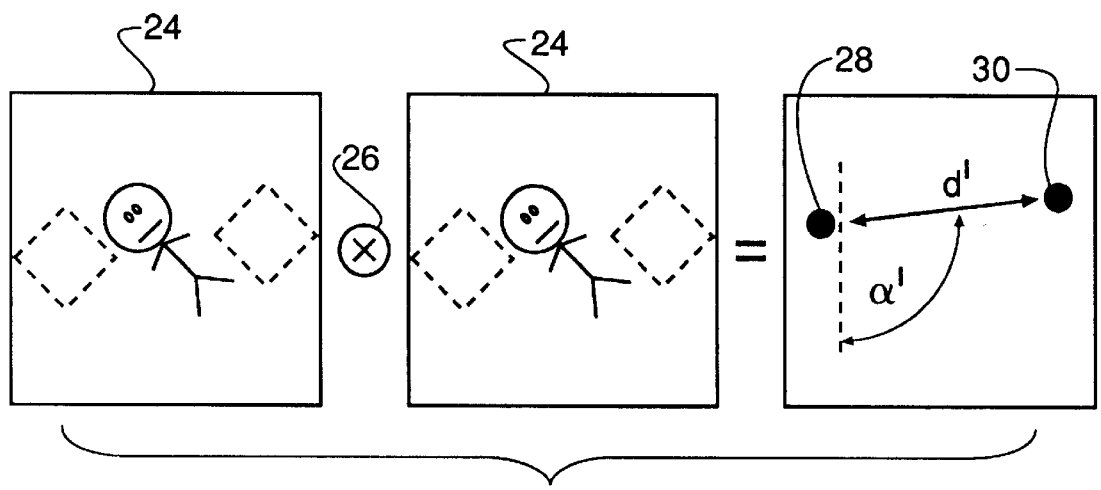
FIG. 4 is a schematic diagram illustrating the recovery of the separation and orientation of the features in a marker image in the modified image.
Figure 5:
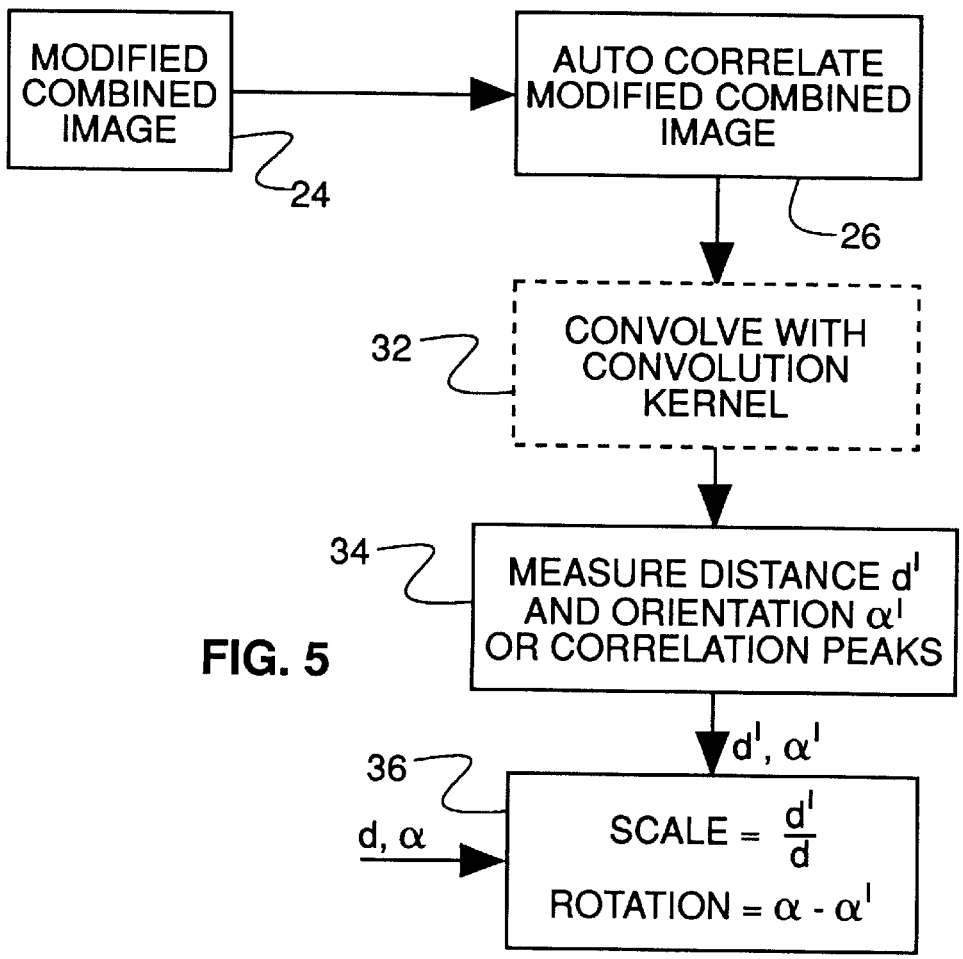
FIG. 5 is a flow chart showing the determination of the rotation and magnification of the modified image and the recovery of the original image size and orientation according to the present invention.

Referring to FIGS. 4 and 5, to determine if and how much the modified combined image 24 has been rotated and scaled, the modified combined image 24 is autocorrelated 26. The autocorrelation will result in two autocorrelation peaks 28 and 30 corresponding to the centers of the features in the marker image 11. The two autocorrelation peaks may, optionally, be further emphasized by convolving 32 the autocorrelated image with a convolution kernel that emphasizes isolated peaks and suppresses smooth regions. An example of a useful convolution kernel is contained in Table 1.

TABLE 1

| 0.0625 | −0.125 | 0.0625 |
|--------|--------|--------|
| −0.125 | 0.250  | −0.125 |
| 0.0625 | −0.125 | 0.0625 |

The autocorrelation peak positions 28 and 30 of the modified image may be measured 34 to obtain the modified distance "d'" and the modified angle "α'" measured with respect to the vertical. If it is of interest to measure rotations greater than 180 degrees, the amplitude of the autocorrelation peaks should be measured.

The modified distance "d'" and the modified angle "α'" may be used to calculate 36 the magnification and rotation that the image has undergone by use of the following formulas:

$$\text{magnification } M = d'/d \times 100 \text{ percent.} \tag{1}$$

If the autocorrelation peak of the upper left hand corner is stronger than the lower right:

$$\text{rotation angle} \Omega = \alpha' - \alpha \text{ degrees.} \tag{2}$$

If the autocorrelation peak of the lower right hand corner is stronger than the upper left:

$$\text{rotation angle} \Omega = \alpha' - \alpha + 180 \text{ degrees.} \tag{3}$$

Appendix A contains a computer program written in the C++ language for generating a random carrier signal, convolving the carrier signal with delta functions and for autocorrelating a modified image useful in practicing the present invention.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example; magnetic storage media such as a magnetic disc (e.g. a floppy disc) or magnetic tape; optical storage media such as optical disc or optical tape; bar code; solid state electronic storage devices such as random access memory (RAM) or read only memory (ROM); or any other physical device or medium employed to store a computer program.

The invention has been described with reference to a preferred embodiment. However, it will be appreciated that variations and modifications can be effected by a person of ordinary skill in the art without departing from the scope of the invention.

-10-

Appendix A

```
     /*
     *
     * Correlation calling routine
5    * Note that when in1==in2, autocorrelation is effected
     *
     *
     */
     #include "image.h"
10   void main(int argc, char *argv[])
     {
            if(argc<4)
            {
                    printf("\n\nUsage: fcorr in1 in2 out");
15                  printf("\nfft based correlation");
                    printf("\nDIM(in1)==DIM(in2)=POW2\n");
                    exit(1);

}
20          else
            {
                    image b(argv[1]);
                    image a(argv[2]);
                    fftmult(&a,&b,CORRELATE);
25                  a.save(argv[3]);
            }
     }
     /*
     * Convolution calling routine
30   */
     #include "image.h"
     void main(int argc, char *argv[])
     {
```

-11-

```
              if(argc<4)
              {
                      printf("\n\nUsage: fconv_exe in1 in2 out");
                      printf("\nfft based convolution");
 5                    printf("\nDIM(in1)==DIM(in2)=POW2\n");
                      exit(1);
              }
              else
              {
10                    image a(argv[1]);
                      image b(argv[2]);
                      fftmult(&a,&b,CONVOLVE);
                      a.save(argv[3]);
              }
15    }

/*
       * Preferred carrier signal generator
       */
20    #include "image.h"
      #define SWAPF(a,b) tempr=(a);(a)=(b);(b)=tempr
      #define ISPOW2(a) ((int)(256.*(double)log(a)/log(2.))==(256*(int)(log(a)/log(2.))))
      double pi2=8.*atan(1.);
      #define get_rand() (double) pi2*rand()/(RAND_MAX)
25    #define rrf(x,y) ((cos(x)*cos(y)+sin(x)*sin(y)))
      #define rif(x,y) ((cos(x)*sin(y)-sin(x)*cos(y)))
      void main(int argc, char *argv[])
      {
              if(argc<2)
30            {
                      printf("\n\nUsage: ortho seed dim [rmin]\n");
                      exit(1);
```

-12-

```
        }
        else
        {
                int seed = atoi( argv[1] );
                int dim = atoi(argv[2]);
                double val,r,i,r1,i1;
                int p,l,pp=dim,p2=dim/2;
                int ll=dim,l2=dim/2;
                image imaginary(1,pp,ll,32);
                image real(1,pp,ll,32 );
                srand(seed);
                double rmin=0;
                if(argc==4) rmin=atof(argv[3]);
                printf("\nZeroing at r = %15.5f\n", rmin);
                double x,y;
                int ix,iy;
                for( l=0;l<l2; l++)
                {
                        for(p=0;p<p2;p++)
                        {
                                x=(double) pi2*rand()/(RAND_MAX);
                                y=(double) pi2*rand()/(RAND_MAX);
                                //UL
                                real.put_pixel(rrf(-x,y),0,p2-p,l2-l);
                                //UR
                                real.put_pixel(rrf(x,y),0,p+p2,l2-l);
                                //LL
                                real.put_pixel(rrf(-x,-y),0,p2-p,l+l2);
                                //LR
                                real.put_pixel(rrf(x,-y),0,p+p2,l+l2);
                                //UL
                                imaginary.put_pixel(rif(-x,y),0,p2-p,l2-l);
                                //UR
```

```
                imaginary.put_pixel(rif(x,y),0,p+p2,l2-l);
                //LL
                imaginary.put_pixel(rif(-x,-y),0,p2-p,l+l2);
                //LR
                imaginary.put_pixel(rif(x,-y),0,p+p2,l+l2);
        }
    }
    for( l=0;l<l2; l++)
    {
            x=(double) pi2*rand()/(RAND_MAX);
            y=(double) pi2*rand()/(RAND_MAX);
            real.put_pixel(rrf(0,y),0,p2,l+1);
            real.put_pixel(rrf(0,-y),0,p2,ll-l-1);
            imaginary.put_pixel(rif(0,y),0,p2,l+1);
            imaginary.put_pixel(rif(0,-y),0,p2,ll-l-1);
    }
    for( p=0;p<p2; p++)
    {
            x=(double) pi2*rand()/(RAND_MAX);
            y=(double) pi2*rand()/(RAND_MAX);
            real.put_pixel(rrf(x,0),0,p+1,l2);
            real.put_pixel(rrf(-x,0),0 ,pp-p-1,l2);
            imaginary.put_pixel(rif(x,0),0,p+1,l2);
            imaginary.put_pixel(rif(-x,0),0,pp-p-1,l2);
    }
    real.put_pixel(0,0,p2,l2);
    imaginary.put_pixel(0,0,p2,l2);
    double radius=0.0;
    if(rmin>0)
    {
            for(l=0;l<ll;l++)
            {
                    for(int p=0;p<pp;p++)
```

-14-

```
                {
                    radius = (p-p2)*(p-p2)+(l-l2)*(l-l2);
                    radius = pow( radius, .5);
    // Don't let too much of the low frequencies get through
    // rmin should be about pi/16 for most photographic images
                    if(radius <=rmin)
                    {
                        val =   real.get_pixel( 0, p,l);
                        val *= pow( (1.0-(rmin - radius )/rmin),2);
                        real.put_pixel(val,0, p,l);
                        val =   imaginary.get_pixel( 0, p,l);
                        val *= pow( (1.0-(rmin - radius )/rmin),2);
                        imaginary.put_pixel(val,0, p,l);
                    }
                }
            }
        }
        __fft(&real,&imaginary,-1);
        char out[128];
        sprintf(out,"ortho_%d_%d.tif",dim,seed);
        real.save(out);
        //sprintf(out,"seed%d_i",seed);
        //imaginary.save(out);
    }
}
/*
 * Frequency domain multiplier - used both in correlation and convolution
 */
#include "image.h"
#define SWAPF(a,b) tempr=(a);(a)=(b);(b)=tempr
#define ISPOW2(a) ( !(a%2))
//void __fft(image *real, image *imag, int direction);
void __four1(float *data, unsigned nn, int isign);
```

−15−

```
      void fftmult(image *real0, image *real1, conjugate type )
      {
              if( !((type==CONVOLVE)||(type==CORRELATE)) )
              {
 5                    printf("Unknown conjugation enum value");
                      exit(1);
              }
              if((real0->get_nbands()!= real1->get_nbands())||
                 (real0->get_npix()!= real1->get_npix())||
10               (real0->get_nlin()!= real1->get_nlin()))
              {
                      real0->report("First image");
                      real1->report("Second image");
                      printf("Attempt to convolve images of unequal dimensions!");
15                    exit(1);
              }
              image imag0(real0->get_nbands(), real0->get_npix(), real0->get_nlin(),32);
              image imag1(real1->get_nbands(), real1->get_npix(), real1->get_nlin(),32);
              if(real0->get_nbits()!=32) *real0=(real0->change_bits_to(32));
20            if(real1->get_nbits()!=32) *real1=(real1->change_bits_to(32));
              __fft(real0,&imag0,1);
              __fft(real1,&imag1,1);
              // Convolution
              // z0*z1
25            // (real0-j imag0) (real1-j imag1) = real0*real1 -imag0*imag1 -j(real1*imag0 +
              real0*imag1)
              // Correlation
              // z0*z1*
              // (real0-j imag0) (real1 + j imag1) = real0*real1 + imag0*imag1 -j(real1*imag0
30            - real0*imag1)
              {
                      image r0,i0;
                      if(type==CONVOLVE)
                      {
```

-16-

```
                    r0 = imag0.operate(1.,"*",1.,imag1,0.);
                    image r1 = real0->operate(1.,"*",1.,*real1,0.);
                    r0=r0.operate((-1.),"+",1,r1,0);
                    i0 = real0->operate(1.,"*",1.,imag1,0.);
 5                  image i1 = real1->operate(1.,"*",1.,imag0,0.);
                    i0=i0.operate(1.,"+",1,i1,0.);
            }
            else if(type==CORRELATE)
            { //imag0*imag1
10                  r0 = imag0.operate(1.,"*",1.,imag1,0.);
                    // real0*real1
                    image r1 = real0->operate(1.,"*",1.,*real1,0.);
                    r0=r0.operate((1.),"+",+1,r1,0);
                    //real0*imag1
15                  i0 = real0->operate(1.,"*",1.,imag1,0.);
                    //real1*imag0
                    image i1 = real1->operate(1.,"*",1.,imag0,0.);
                    i0=i0.operate(-1.,"+",1,i1,0.);
            }
20          *real0=(r0);
            *real1=(i0);
      }
      __fft(real0,real1,-1);
}
25 /*
   *       FFT of image
   */
   #include "image.h"
   #define SWAPF(a,b) tempr=(a);(a)=(b);(b)=tempr
30 #define ISPOW2(a) ( !(a%2))
   //void __fft(image *real, image *imag, int direction);
   void __four1(float *data, unsigned nn, int isign);
   void fftmult(image *real0, image *real1, conjugate type )
```

```
            {
                    f( !((type==CONVOLVE)||(type==CORRELATE)) )
                    {
                            printf("Unknown conjugation enum value");
 5                          exit(1);
                    }
                    if((real0->get_nbands()!= real1->get_nbands())||
                       (real0->get_npix()!= real1->get_npix())||
                       (real0->get_nlin()!= real1->get_nlin()))
10                  {
                            real0->report("First image");
                            real1->report("Second image");
                            printf("Attempt to convolve images of unequal dimensions!");
                            exit(1);
15                  }
                    image imag0(real0->get_nbands(), real0->get_npix(), real0->get_nlin(),32);
                    image imag1(real1->get_nbands(), real1->get_npix(), real1->get_nlin(),32);
                    if(real0->get_nbits()!=32) *real0=(real0->change_bits_to(32));
                    if(real1->get_nbits()!=32) *real1=(real1->change_bits_to(32));
20                  __fft(real0,&imag0,1);
                    __fft(real1,&imag1,1);
                    // Convolution
                    // z0*z1
                    // (real0-j imag0) (real1-j imag1) = real0*real1 -imag0*imag1 -j(real1*imag0 +
25                  real0*imag1)
                    // Correlation
                    // z0*z1*
                    // (real0-j imag0) (real1 + j imag1) = real0*real1 + imag0*imag1 -j(real1*imag0
                    - real0*imag1)
30                  {
                            image r0,i0;
                            if(type==CONVOLVE)
                            {
                                    r0 = imag0.operate(1.,"*",1.,imag1,0.);
```

```
                image r1 = real0->operate(1.,"*",1.,*real1,0.);
                r0=r0.operate((-1.),"+",1,r1,0);
                i0 = real0->operate(1.,"*",1.,imag1,0.);
                image i1 = real1->operate(1.,"*",1.,imag0,0.);
5               i0=i0.operate(1.,"+",1,i1,0.);
            }
            else if(type==CORRELATE)
            { //imag0*imag1
                r0 = imag0.operate(1.,"*",1.,imag1,0.);
10          // real0*real1
                image r1 = real0->operate(1.,"*",1.,*real1,0.);
                r0=r0.operate((1.),"+",+1,r1,0);
                //real0*imag1
                i0 = real0->operate(1.,"*",1.,imag1,0.);
15          //real1*imag0
                image i1 = real1->operate(1.,"*",1.,imag0,0.);
                i0=i0.operate(-1.,"+",1,i1,0.);

}
20          *real0=(r0);
            *real1=(i0);
        }
        __fft(real0,real1,-1);
    }
25  void __fft(image *real, image *imag, int direction)
    {
        //  printf("\ndirection ==-1 => inverse \n");
        //  printf("\ndirection == 1 => forward \n");
            if(!ISPOW2(real->get_npix())||
30              !ISPOW2(real->get_nlin())||
                !ISPOW2(imag->get_npix())||
                !ISPOW2(imag->get_nlin()))
            {
```

```
                    printf("(%d, %d) - (%d, %d)",real->get_npix(),real-
        >get_nlin(),imag->get_npix(),imag->get_nlin() );
                    printf("\nDimension not a power of 2!\n");
                    exit(1);
5           }
            if((real->get_npix()!=imag->get_npix())||
                (real->get_nbands()!=imag->get_nbands())||
                (real->get_nlin()!=imag->get_nlin()) )
            {
10                  printf("\nimaginary image not same dimensions of real image\n");
                    exit(1);
            }
            if(real->get_nbits()!=32) real->deepcpy(real->change_bits_to(32));
            if(imag->get_nbits()!=32) imag->deepcpy(imag->change_bits_to(32));
15          float *temp_data;
            float *off_ptr;
            float *off_ptr1;
            temp_data = new float [5*MAX( real->get_npix(),real->get_nlin() )];
            off_ptr = &temp_data[MAX( real->get_npix(),real->get_nlin() )]-1;
20          off_ptr1 = &temp_data[MAX( real->get_npix(),real->get_nlin() )];
            memset(temp_data,0,5*MAX( real->get_npix(),real->get_nlin()
        )*sizeof(float));
            register int sum,p,l;
            if(direction==-1)
25          {
                    real->orient();
                    imag->orient();
            }
            for(int ib=0 ; ib<real->get_nbands(); ib++)
30          {
                    // Horizontal
                    for( l=0 ; l<real->get_nlin(); l++)
                    {
                            sum=0;
```

-20-

```
        for(register int p=0;p<real->get_npix();p++)
        {
                off_ptr1[sum]=real->get_pixel(ib,p,l);
                sum++;
                off_ptr1[sum]=imag->get_pixel(ib,p,l);
                sum++;
        }
        __four1(off_ptr ,real->get_npix(),direction);
        sum=0;
        for(p=0;p<real->get_npix();p++)
        {
                real->put_pixel(off_ptr1[sum],ib,p,l);
                sum++;
                imag->put_pixel(off_ptr1[sum],ib,p,l);
                sum++;
        }
}
// Vertical
for(p=0 ; p<real->get_npix(); p++)
{
        sum=0;
        for(l=0;l<real->get_nlin();l++)
        {
                off_ptr1[sum]=real->get_pixel(ib,p,l);
                sum++;
                off_ptr1[sum]=imag->get_pixel(ib,p,l);
                sum++;
        }
        __four1(off_ptr,real->get_nlin(),direction);
        sum=0;
        for(l=0;l<real->get_nlin();l++)
        {
                real->put_pixel(off_ptr1[sum],ib,p,l);
```

-21-

```
                            sum++;
                            imag->put_pixel(off_ptr1[sum],ib,p,l);
                            sum++;
                        }
                    }
                }
                float norm;
                if(direction==1) norm = pow(2./(real->get_nlin()*real->get_npix()),.5);
                else  norm = pow(1./(real->get_nlin()*real->get_npix()),.5);
                for(ib=0 ; ib<real->get_nbands(); ib++)
                {
                    for( l=0 ; l<real->get_nlin(); l++)
                    {
                        for( p=0 ; p<real->get_npix(); p++)
                        {
                            real->put_pixel(real->get_pixel(ib,l,p)*norm,
                                ib,l,p);
                            imag->put_pixel(imag->get_pixel(ib,l,p)*norm,
                                ib,l,p);
                        }
                    }
                }
                delete [] temp_data;
                // Now put the arrray in a useful form...
                if(direction==1)
                {
                    real->orient();
                    imag->orient();
                }
        }
void image::orient()
{
                image br=copy(get_npix()/2,get_nlin()/2,get_npix()-1,get_nlin()-1);
                image bl=copy(0,get_nlin()/2,get_npix()/2-1,get_nlin()-1);
```

-22-

```
                image tl=copy(0,0,get_npix()/2-1,get_nlin()/2-1);
                image tr=copy(get_npix()/2,0,get_npix()-1,get_nlin()/2-1);
                paste(0,0,br);
                paste(get_npix()/2,get_nlin()/2,tl);
5               paste(0,get_nlin()/2,tr);
                paste(get_npix()/2,0,bl);
        }
        /*
         * Standard 1 d fft
10       */
        void __four1(float *data, unsigned nn, int isign)
        {
                unsigned n,mmax,m,j,istep,i;
                float wtemp,wr,wpr,wpi,wi,theta;
15              float tempr,tempi;
                float norm = pow(nn,-0.5);
                n=nn << 1;
                j=1;
                for (i=1;i<n;i+=2) {
20                      if (j > i) {
                                SWAPF(data[j],data[i]);
                                SWAPF(data[j+1],data[i+1]);
                        }
                        m=n >> 1;
25                      while (m >= 2 && j > m) {
                                j -= m;
                                m >>= 1;
                        }
                        j += m;
30              }
                mmax=2;
                while (n > mmax) {
                        istep=mmax << 1;
```

-23-

```
            theta=isign*(6.28318530717959/mmax);
            wtemp=sin(0.5*theta);
            wpr = -2.0*wtemp*wtemp;
            wpi=sin(theta);
5           wr=1.0;
            wi=0.0;
            for (m=1;m<mmax;m+=2) {
                    for (i=m;i<=n;i+=istep) {
                            j=i+mmax;
10                          tempr=wr*data[j]-wi*data[j+1];
                            tempi=wr*data[j+1]+wi*data[j];
                            data[j]=data[i]-tempr;
                            data[j+1]=data[i+1]-tempi;
                            data[i] += tempr;
15                          data[i+1] += tempi;
                    }
                    wr=(wtemp=wr)*wpr-wi*wpi+wr;
                    wi=wi*wpr+wtemp*wpi+wi;
            }
20          mmax=istep;
        }
    }
```

We claim:

1. A method for detecting an amount of rotation or magnification in a modified image, comprising the steps of:
   a) embedding a marker image having a pair of identical features separated by a distance d and oriented at an angle α in an original image to produce a marked image, the marked image having been rotated and/or magnified to produce the modified image;
   b) performing an autocorrelation on the modified image to produce a pair of autocorrelation peaks corresponding to the location of the features of the marker image in the modified image; and
   c) comparing the separation d' and orientation α' of the autocorrelation peaks with the separation d and orientation α of the features in the marker image to determine the amount of rotation and magnification in the modified image.

2. The method claimed in claim 1, further comprising the steps of:
   prior to embedding, convolving the marker image with a carrier image to disperse the marker image features throughout the marker image; and after the autocorrelation, convolving the autocorrelation with the carrier image to recover the autocorrelation peaks.

3. The method claimed in claim 1, further comprising the steps of: convolving the autocorrelation peaks with a convolution kernel that emphasizes isolated peaks and suppresses smooth regions.

4. The method claimed in claim 3, wherein the convolution kernel comprises:

| | | |
|---|---|---|
| 0.0625 | −0.125 | 0.0625 |
| −0.125 | 0.250 | −0.125 |
| 0.0625 | −0.125 | 0.0625 |

5. The method claimed in claim 1, further comprising the step of measuring the relative amplitudes of the correlation peaks to determine the orientation of the modified image.

6. The method claimed in claim 5, wherein the orientation is determined as follows:
   if the autocorrelation peak of the upper left hand corner is stronger than the lower right:

rotation angle=α'−α degrees; and if the autocorrelation peak of the lower right hand corner is stronger than the upper left:

rotation angle=α'−α+180 degrees.

7. A computer program product, comprising a computer readable storage medium having a computer program stored thereon for detecting an amount of rotation or magnification in a modified image, for performing the steps of:
   a) embedding a marker image having a pair of identical features separated by a distance d and oriented at an angle α in an original image to produce a marked image, the marked image having been rotated and/or magnified to produce the modified image;
   b) performing an autocorrelation on the modified image to produce a pair of autocorrelation peaks corresponding to the location of the features of the marker image in the modified image; and
   c) comparing the separation d' and orientation α' of the autocorrelation peaks with the separation d and orientation α of the features in the marker image to determine the amount of rotation and magnification in the modified image.

* * * * *